(12) United States Patent
Xiang (10) Patent No.: US 9,686,213 B2
(45) Date of Patent: Jun. 20, 2017

(54) METHOD AND SYSTEM FOR ACCOUNT RECOMMENDATION (71) Applicant: Tencent Technology (Shenzhen) Company Limited, Shenzhen (CN)

(72) Inventor: Guoyi Xiang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/191,312

(22) Filed: Jun. 23, 2016

(65) Prior Publication Data
US 2016/0308800 A1   Oct. 20, 2016

Related U.S. Application Data (63) Continuation of application No. PCT/CN2014/091611, filed on Nov. 19, 2014.

(30) Foreign Application Priority Data

Apr. 30, 2014 (CN) .......................... 2014 1 0182946

(51) Int. Cl.
G06F 15/16 (2006.01)
H04L 12/58 (2006.01)
H04L 29/08 (2006.01)
(52) U.S. Cl.
CPC ............ *H04L 51/046* (2013.01); *H04L 51/32* (2013.01); *H04L 67/22* (2013.01); *H04L 67/306* (2013.01)

(58) Field of Classification Search
USPC .................................................. 709/204, 206
See application file for complete search history.

(56) References Cited

U.S. PATENT DOCUMENTS

2013/0218883 A1    8/2013  McConnell et al.
2013/0218991 A1*   8/2013  McConnell ....... G06F 17/30702
                                                        709/206

FOREIGN PATENT DOCUMENTS

CN    101446961 A    6/2009
CN    101540739 A    9/2009
(Continued)

OTHER PUBLICATIONS

Tencent Technology, ISRWO, PCT/CN2014/091611, Mar. 3, 2015, 6 pgs.
(Continued)

*Primary Examiner* — Hee Soo Kim
(74) *Attorney, Agent, or Firm* — Morgan, Lewis & Bockius LLP (57) ABSTRACT

Method and device of recommending public social network accounts on a social network platform are disclosed. The method includes: a user device obtaining a user profile of a user account of the social network platform, the user profile including at least identity and online behavior information of a user associated with the user account; selecting one or more information items from the user profile in accordance with a matching algorithm for selecting the recommended public social network accounts; running the matching algorithm to obtain at least one recommended public social network account that matches the selected information items; and recommending the at least one public social network account to the user associated with the user account.

20 Claims, 5 Drawing Sheets

(56) References Cited

FOREIGN PATENT DOCUMENTS

| CN | 102957676 A | 3/2013 |
|---|---|---|
| CN | 103475571 A | 12/2013 |
| CN | 103490984 A | 1/2014 |
| CN | 103501265 A | 1/2014 |
| CN | 103685502 A | 3/2014 |

OTHER PUBLICATIONS

Tencent Technology, IPRP, PCT/CN2014/091611, Nov. 1, 2016, 4 pgs.

* cited by examiner

METHOD AND SYSTEM FOR ACCOUNT RECOMMENDATION

RELATED APPLICATION

This application is a continuation application of PCT Patent Application No. PCT/CN2014/091611, entitled "METHOD AND SYSTEM FOR ACCOUNT RECOMMENDATION" filed on Nov. 19, 2014, which claims priority to Chinese Patent Application No. 201410182946.4, entitled "ACCOUNT RECOMMENDATION METHOD, APPARATUS AND SYSTEM FOR INSTANT MESSAGING APPLICATIONS" filed on Apr. 30, 2014, both of which are incorporated by reference in their entirety.

TECHNICAL FIELD

The disclosed implementations relate generally to the field of internet, and in particular, to account recommendation method, apparatus and system for instant messaging application.

BACKGROUND

A public social network account is an account associated with public figures, companies, government agencies, organizations, service providers, etc. Typically, a public account has a transparent profile, welcomes and actively seeks followers and provides certain services or content on a regular basis. The public accounts differ from an individual users' accounts in that, a public account can have followers or subscribers (e.g., individual user's accounts), and the public account can broadcast messages (e.g., instant messages) to the followers or subscribers through a single posting (e.g., by an administrator of the public account or a server machine in charge of the public account). In some cases, a public account may also provide customized messages that are tailored for each individual follower or subscriber based on information known about the follower or subscriber (e.g., current location, account balance, recent purchase, etc.) at the server of the public account. For example, a public account, "Weather Service" may provide services including daily weather forecast, customized weather news, and historical weather data. A music celebrity's public account may post concert news, tour plans, messages to fans, etc.

Currently, public accounted can only be actively found and subscribed by user accounts. It is desirable to have a method, device or system that can recommend desirable public accounts to users.

SUMMARY

In accordance with some implementations of the disclosed technology, a method of recommending public social network accounts on a social network platform is disclosed. The method comprises: a server (e.g., server 60 in FIG. 6 or server 800 in FIG. 8) obtaining a user profile of a user account of the social network platform, the user profile including at least identity and online behavior information of a user associated with the user account; selecting one or more information items from the user profile in accordance with a matching algorithm for selecting the recommended public social network accounts; running the matching algorithm to obtain at least one recommended public social network account that matches the selected information items; and recommending the at least one public social network account to the user associated with the user account.

In another aspect, a device (e.g., server 60 in FIG. 6 or server 800 in FIG. 8) comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

Although some aspects, functions, and processes are described from the perspective of the server, the corresponding aspects, functions and processes performed at the user devices are apparent to persons skilled in the art in light of the descriptions provided herein. Other aspects and advantages are apparent in light of the descriptions provided below.

BRIEF DESCRIPTION OF DRAWINGS

The aforementioned implementation of the application as well as additional implementations will be more clearly understood as a result of the following detailed description of the various aspects of the application when taken in conjunction with the drawings. Like reference numerals refer to corresponding parts throughout the several views of the drawings.

DETAILED DESCRIPTION

To make the purpose, the technical scheme and the advantages of the application more clear, the application is further described in details by combining the accompanying drawings and embodiments. It should be understood that the specific embodiments described herein are only used for explaining the application, but not used for limiting the application.

Figure 1:
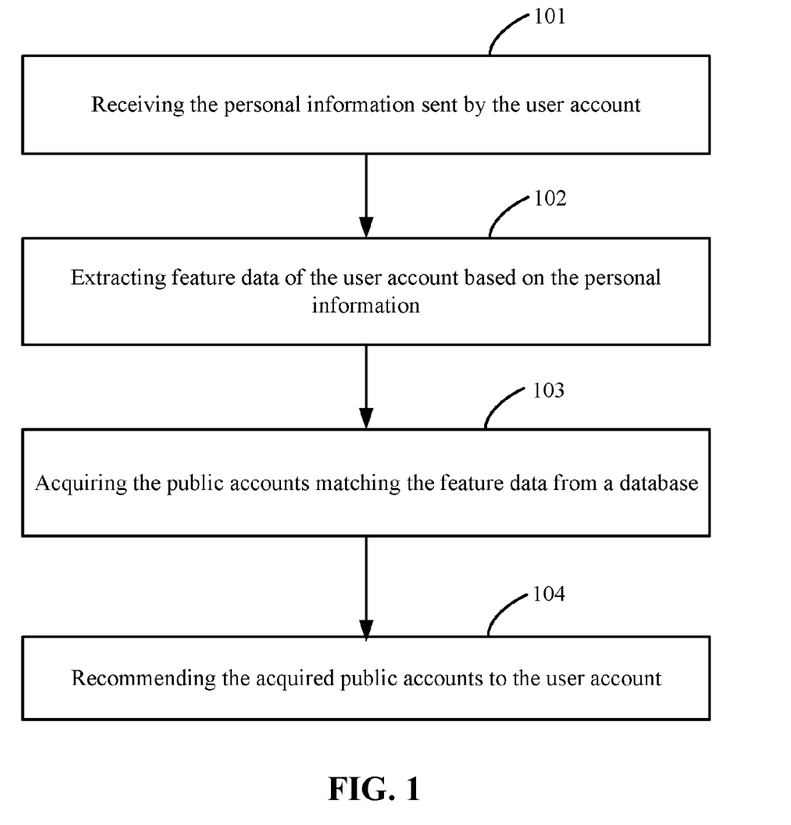
FIG. 1 is a flowchart of an account recommendation method for instant messaging application in accordance with some embodiments.

FIG. 1 shows an implementing flow of an account recommendation method for instant messaging application provided by a server in accordance with some embodiments. In this application, a server of a social network platform may be formed by a plurality of networked servers for executing different functions and the specific architecture mode of the server will be exemplarily illustrated in the subsequent embodiments. As shown in FIG. 1, the implementing flow of the account recommendation method for the instant messaging application may include the following steps.

In accordance with some embodiments, in step S101, the server receives the user profile sent by a user account terminal.

In accordance with some embodiments, the user account may be bound with a terminal which creates the user account in the social network system and is used for interacting with other accounts in the social network system in a one-to-one or one-to-many mode and receiving or sending information such as characters, pictures, voice or videos and the like. The terminal comprises, but not limited to, a mobile phone, a tablet personal computer and other Mobile Internet Devices (MID).

In accordance with some embodiments, when the terminal is connected to the network, communication with the server may be implemented by network data interaction on the basis of a client of an instant messaging application, which is locally installed. Particularly, specific communication protocols may be appointed between the user account and the server. In the communication protocols, a format used in a data unit, information and meanings which should be included in an information unit, a connection mode and information sending/receiving time sequences are defined, so that related network data is guaranteed to be successfully transmitted to the server from the user account.

For example, the communication protocols which can be adopted between the user account and the server: a transmission control protocol/internet protocol, a Hypertext Transfer Protocol (HTTP), a Simple Mail Transfer Protocol (SMTP), the third version of a Post Office Protocol (POP) and the like. And information interaction can be executed between the user account and the server by various communication standards. For example, various communication standards such as a Global System for Mobile Communications (GSM), Wideband Code Division Multiple Access (WCDMA), Code Division Multiple Access (CDMA), Time Division Synchronous CDMA (TDS-CDMA) and the like can be adopted.

In accordance with some embodiments, the user account terminal sends the user profile of the user account to the server in a predetermined network data interaction mode.

In accordance with some embodiments, the user profile includes user's identity information, such as name, age, gender, occupation, constellation, current location, network behavior features of the user account, current geographical positions of the user accounts, and message contents transmitted and recommended by the user account in the social network.

In step S102, the server extracts information items of the user account from the user profile. In accordance with some embodiments, the server filters the user profile and obtains the information items for the subsequent matching process from user profile.

In step S103, the server acquires the public accounts matching the information items from a database.

In accordance with some embodiments, information of all the public accounts in the social network system is stored in related databases of the server. In accordance with some embodiments, the server uses the information items extracted in S102 to carry out a match in the public account database based on a preset matching principle.

In step S104, the server recommends the acquired public accounts to the user account.

In accordance with some embodiments, the server pushes the public accounts matched in S103 to the user account so as to complete recommendation of the public accounts to the user account.

In some embodiments, the acquired public accounts are pushed to the user account at designated system time points. A push frequency of the server is limited by designating push time. For example, push of the public accounts is only allowed to be executed at three system time points of 7:00 in the morning, 12:00 at noon and 20:00 at evening every day. The push time buckets and the push frequency of the server are limited by the three system time points.

In some embodiments, a designated number of acquired public accounts are pushed to the user account. The number of pushes of the public accounts is limited. For example, three matched public accounts are recommended to the user account each time.

Next, the related flows of carrying out further processing on different user profile by the server in S102 are respectively described and explained as follows.

Figure 2:
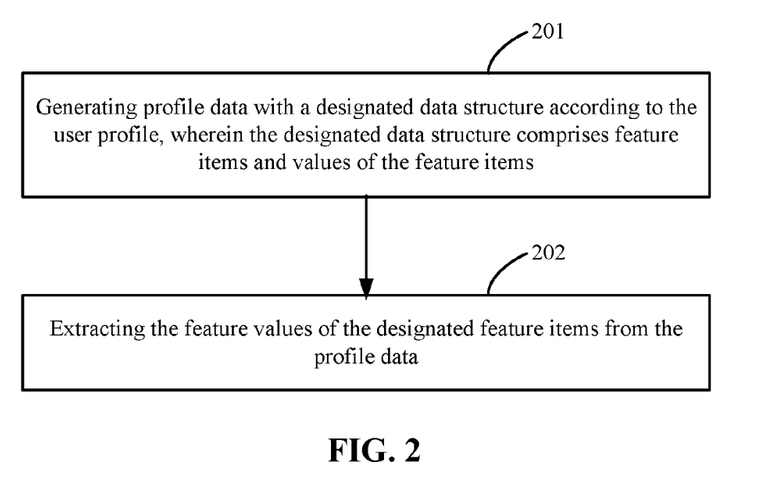
FIG. 2 is a flowchart of an account recommendation method for the instant messaging application in accordance with some embodiments.

In S201, profile data with a designated data structure is generated according to the user profile and the designated data structure comprises feature items and feature values of the feature items.

In accordance with some embodiments, the designated data structure is preset by the server. For example, for all user accounts in the social network system, the basic information of the users, such as names, locations, dates of birth, constellations and the like, needs to be filled out in the registration process. As for the user profile, the server may preset names, locations, dates of birth and constellations as the feature items. For the user profile sent by a user account, the server may extract the feature values of the feature items from the user profile so as to filter and arrange the disordered and complicated user profile into the profile data with the designated data structure.

In accordance with some embodiments, in step S202, the server extracts the feature values of the designated feature items from the profile data.

For example, when the server needs to recommend the public accounts to users in an age range, the designated feature item at the moment is "date of birth". And the corresponding feature value is extracted from the profile data according to the feature items to determine the age range of the user of the user account.

For another example, when a user moves from City A to City B, the user account sends the location information to the server. The server extracts the feature value "City B" of the feature items "current location" from the user profile, uses the feature value to carry out a match and acquire the public accounts related to the feature value "City B", e.g., a public account related to weather of City B.

Figure 3:
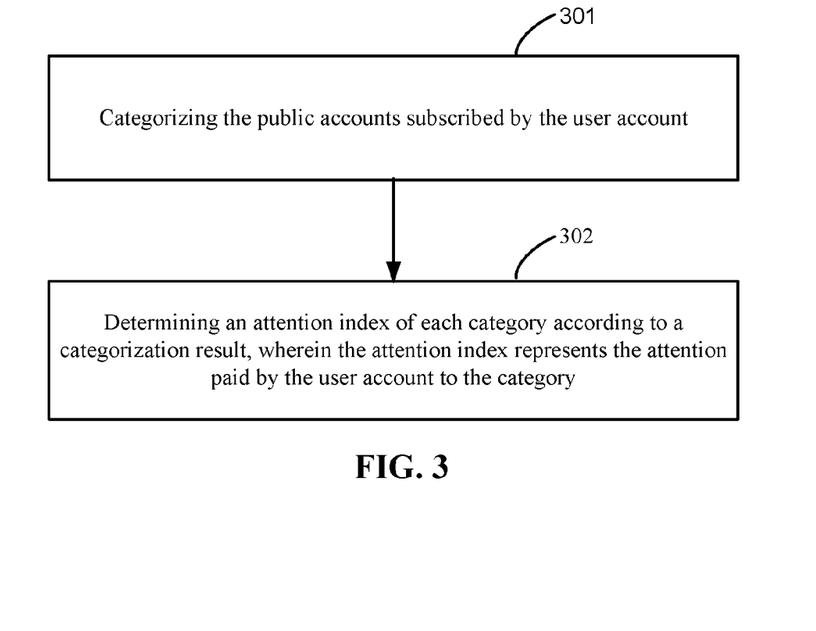
FIG. 3 is a flowchart of an account recommendation method for the instant messaging application according to some embodiments.

In accordance with some embodiments, the user profile comprises the public accounts subscribed by the user account, and as shown in FIG. 3, the step S102 includes the following steps.

In step S301, the server categorizes the public accounts subscribed by the user account.

In accordance with some embodiments, the server may carry out categorization and archiving all the existing public accounts in the social network system in advance. For example, categories may include news, entertainment, business service, life, etc. When the server acquires the public accounts subscribed by the user account, the public accounts subscribed by the user account are categorized according to the set categories.

In accordance with some embodiments, in step S302, the server determines an attention index of each category according to a categorization result. The attention index of a category represents the attention paid by the user account to the category.

In accordance with some embodiments, after categorizing the public accounts subscribed by the user account, the server determines the attention of the user account to each category so as to further forecast the categories of the public accounts which the user of the user account is interested in.

Figure 4:
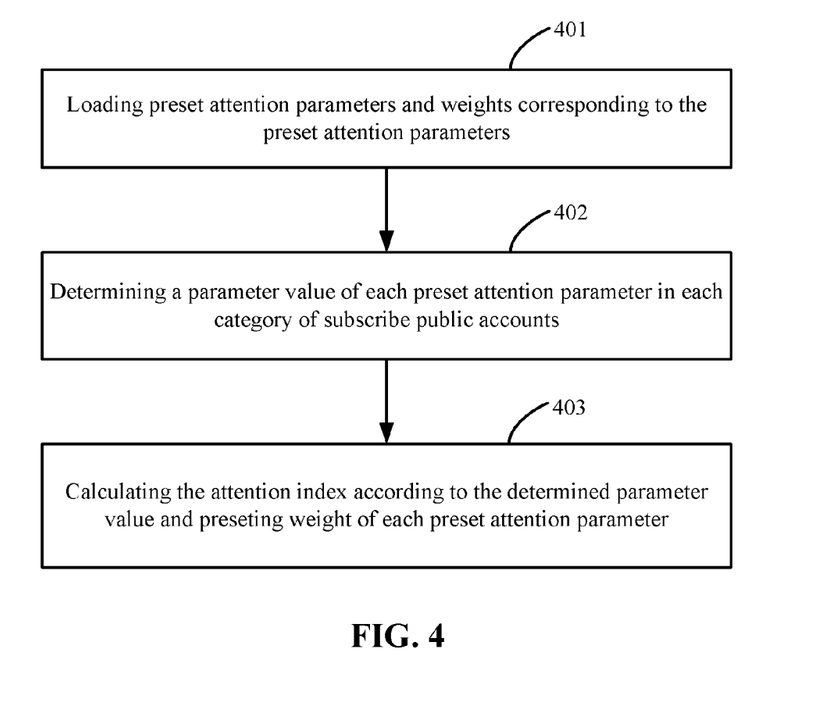
FIG. 4 is a flowchart of an account recommendation method for the instant messaging application in accordance with some embodiments.

As one specific implementation of S302, FIG. 4 illustrates the process of determining the attention indices of categories.

In accordance with some embodiments, in step S401, the server obtains preset attention parameters and their respective weights. The preset attention parameters may comprise at least one of the following parameters: a number of the subscribed public accounts in the category, a frequency that the user account forwards messages of the public accounts in the category, and times that the user account recommends the public accounts in the category.

For each attention parameter, the server presets the corresponding weight. For example, the same weight may be given to each attention parameter.

In accordance with some embodiments, in step S402, the server determines a parameter value of each preset attention parameter for each category of the subscribed public accounts.

In accordance with some embodiments, in step S403, the server calculates the attention index according to the determined parameter value and preset weight of each preset attention parameter.

For example, when the weights corresponding to the three attention parameters are all equal to 1, a user account subscribes three public accounts in the news category, the user account forwards messages of the public accounts in the category twice a day and the user account recommends the public accounts in the category five times, the attention index of the user account for the news category is calculated as 1*3+1*2+1*5=10.

By the steps, the server may respectively calculate the attention index of the user account for each public account category and recommend the public accounts with the highest attention index in a plurality of categories of public account, which are not added into the user account, to the user account according to the calculation result.

A specific application scenario of carrying out recommendation of the public accounts according to the current subscription is provided. When a user account subscribes a plurality of public accounts of fiction websites or fiction authors, public accounts in fiction categories are assigned a high attention index of the user account, so that the server recommends the public accounts to the user account. The public accounts in the fiction categories are recommended to the user account or the public accounts of the same type of fiction authors are recommended to the user account according to the writing type of the fiction authors.

Figure 5:
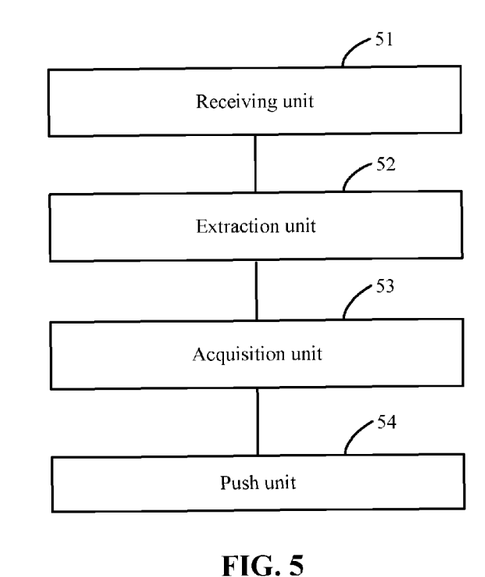
FIG. 5 is a structure diagram of an account recommendation apparatus for the instant messaging application in accordance with some embodiments.

FIG. 5 shows a structure diagram of an account recommendation apparatus for the instant messaging application in accordance with some embodiments. The apparatus may be the server of the social network system and is used for operating the account recommendation method for the instant messaging application in the embodiments shown in other figures. To conveniently illustrate, only parts related to the embodiment are shown.

With reference to FIG. 5, the apparatus comprises: a receiving unit 51 for receiving the user profile sent by the user account; an extraction unit 52 for extracting the information items of the user account according to the user profile; an acquisition unit 53 for acquiring the public accounts matching the information items from the database; and a push unit 54 for recommending the acquired public accounts to the user account.

Optionally, the user profile comprises the behavioral data of the user account.

The extraction unit 52 comprises: a generation subunit for generating the profile data with the designated data structure according to the user profile; and an extraction subunit for extracting the feature values of the designated feature items from the profile data.

Optionally, the user profile comprises the public accounts subscribed by the user account.

The extraction unit 52 comprises: a categorization subunit for carrying out categorization on the public accounts subscribed by the user account; and a determination subunit for determining the attention index of each category according to the categorization result.

Optionally, the determination subunit is particularly used for: loading the preset attention parameters and the weights corresponding to the preset attention parameters; determining the parameter value of each preset attention parameter in each category to which the public accounts subscribed by the user account belong; and calculating the attention index of the corresponding category.

Optionally, the push unit 54 is particularly used for recommending public accounts to the user account at the designated system time points.

Figure 6:
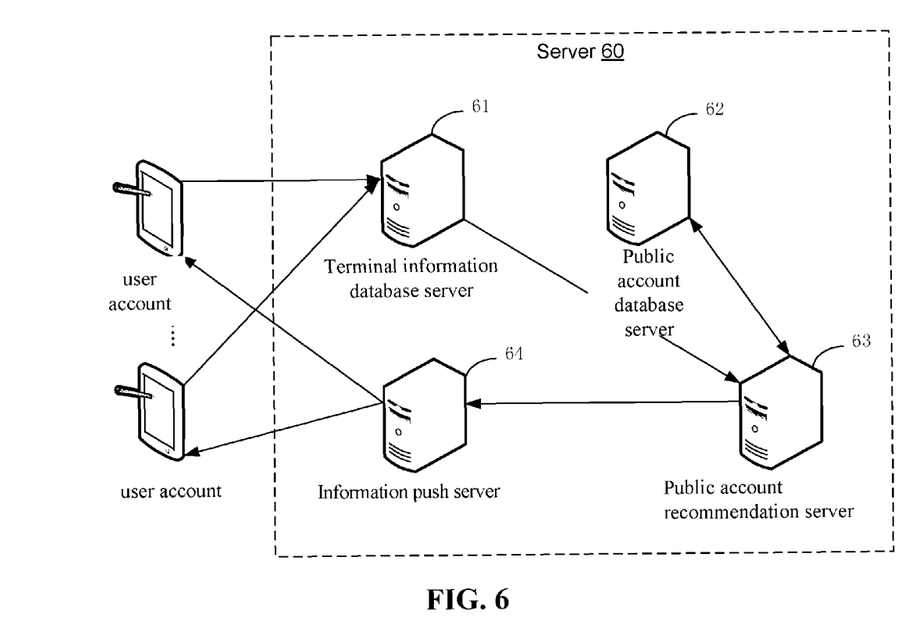
FIG. 6 is a schematic diagram of exemplary architecture of a server of an social network system in accordance with some embodiments.

FIG. 6 shows a schematic diagram of exemplary architecture of the server 60 of the social network system in accordance with some embodiments. The server 60 may be formed by a plurality of networked servers for executing different functions. And the related functions implemented by the server in the embodiment are all respectively implemented by a plurality of specific functional servers. The implementation architecture particularly comprises: a terminal information database server 61, a public account database server 62, a public account recommendation server 63, and an information push server 64.

In some embodiments, the terminal information database server 61 is configured for carrying out network data interaction with the user account and receiving the user profile sent by the user account. The public account database server 62 is configured for storing related information of all the registered public accounts in the social network system. The public account recommendation server 63 is configured for extracting the information items of the user account according to the user profile of the user account, and acquiring the public accounts matching the information items from the public account database server 62. The information push server 64 is configured for pushing the public accounts acquired by the public account recommendation server 63 to the user account.

Figure 7:
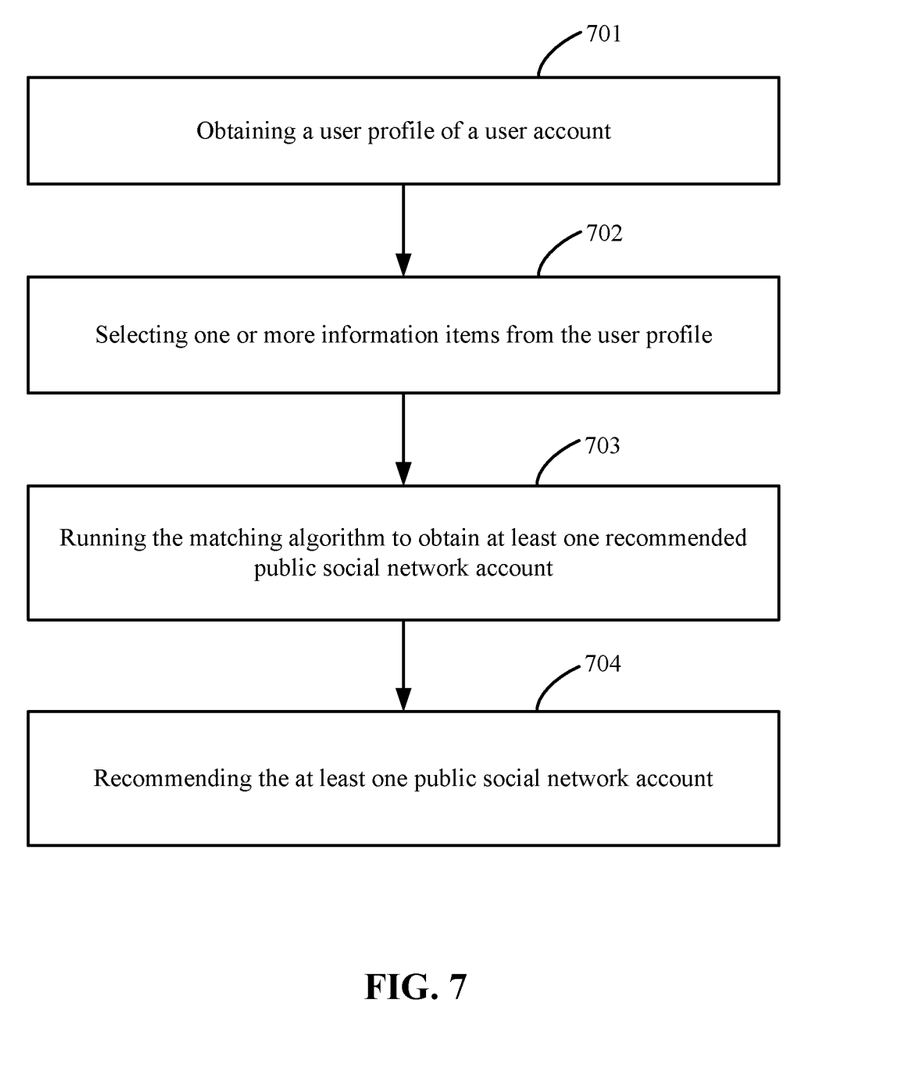
FIG. 7 is a flowchart of recommending public social network accounts on a social network platform in accordance with some embodiments.

FIG. 7 is a flowchart of recommending public social network accounts on a social network platform in accordance with some embodiments. In some embodiments, the method is performed at a server of having one or more processors and memory for storing one or more programs to be executed by the one or more processors.

In accordance with some embodiments, in a step 701, the server obtains a user profile of a user account of the social network platform, the user profile including at least identity and online behavior information of a user associated with the user account. Identity information is any written information that describes the identity or character of the user, which includes user's name, job, gender, location, hobby, etc. Typically, the server can obtain the identity information from a registration form that the user fills for set up. In accordance with some embodiments, the online behaviors include social network behaviors of the social network user account, e.g., chat messages, friends, subscription, video recommendation, etc.

For example, user A has an account A of a social network application which runs on user A's smart phone. The server may obtain the identity information and online behavior information through regulation of the account A. For identity information, user A has entered into his profile form user profile including his name, address, telephone number, occupation, Alma mater, high school, hometown, astrological sign, hobby, favorite songs, etc. The information from profile form is stored in the server. Some of the identity information is visible to the user A's social network friends only but can be used to recommend public accounts as well. In addition, some of user's A's online behavior is conducted through the social network application, including following, subscription, adding contacts, "like", recommending articles, sharing photos, listening to music, etc. Since these behaviors are conducted through the social network application, the server of the social network platform can obtain these behaviors in the process of regulating them.

In addition, there is some identity and online information that is obtained from activity data from other applications on the smart phone of the user A. For example, user A registers his preferences for movies and books (identity information) in an application B and always makes on-line purchase through an application C, which store user A's purchase record (online behavior). In some embodiments, the social network application can collect the preferences for movies and books from application B and purchase record from the application C and send this information to the server. Sometimes, the social network application can also collect the activity data from other social network applications installed on the user's device, such as the social network applications for other social network platforms. From the activity data collected from the other social network applications, the activity data can include the contacts, chat messages, likes, subscriptions, etc. of the user on the other social network platforms.

However, users may have privacy concerns with such collection. The user may exert control on the scope of information items to be included in the user profile or used to recommend public accounts. In accordance with some embodiments, the server receives a user instruction for restricting a scope of information items to be included in the user profile or to be used in obtaining the at least one recommended public social network account, wherein, in accordance with the user instruction, the social network application changes a scope of activity data of another application on the user device that is subject to collection by a client application of the social network platform. Alternatively, the server identifies the at least one recommended public social network account in accordance with the information items within the restricted scope specified by the user instruction. For example, the user may only allow certain social network platforms to be accessed for public account subscription information, the user may only allow certain contacts to be used for recommending public accounts, the user may only allow certain chat messages to be accessed, the user may only allow recommendation for a subset of the already subscribed public accounts, etc. This change can be made by the client device in response to the user's instruction directly, or through the server's instruction after the server receives the user's instruction through the client device.

In accordance with some embodiments, the social network application collects useful information, but instead sending the server all collected information, the application only sends a statistical or summarized result to the server. For example, instead of reporting to the server that user A has watched "Casablanca," "Love Actually," and "Titanic" last month, the social network application just sends to server that user A watches 3 romantic movies last month. In some embodiments, the process includes: the server receives categories of available identity and on-line behavior information, generates desired public account selection parameters in accordance with the matching algorithm; sends desired public account selection parameters (e.g., romantic movies watched, subscription to public accounts of singers, friends' age group, location, etc.) to a user device associated with the user account; and receives respective parameter values for the desired selection parameters (e.g., romantic movies watched: 3, subscription to public accounts of singers: 15, friends' age group: 30-45, location: urban, etc.) from the user device, wherein the user device, in accordance with the desired public account selection parameters, collects activity data from at least one other application on the user device and generates the parameter values for the desired selection parameters by summarizing the collected activity data.

In accordance with some embodiments, in a step 702, the server selects one or more information items from the user profile in accordance with a matching algorithm for selecting the recommended public social network accounts. The matching algorithm may only make use of part of information items in user profiles. For example, statistical research may show that, users' favorite newspapers strongly influences user's preferences for public accounts, while users' favorite vacation places have little or no influences. The matching algorithm then makes the server to select "favorite newspaper" when available but neglects "favorite vacation place."

In accordance with some embodiments, in a step 703, the server runs the matching algorithm to obtain at least one recommended public social network account that matches the selected information items.

In accordance with some embodiments, the online behavior information includes one or more existing public social network accounts subscribed by the user account on the social network platform. The server identifies one or more public social network accounts that are similar to the one or more existing public social network accounts subscribed by the user account on the social network platform as the at least one recommended public social network account. In some embodiments, "similar" means within the same category, having at least x number of similar characteristics, e.g., genre, gender, public image, clothes style, political orientation, etc. For example, the server finds that a user subscribes public accounts called "basketball fans" and "LA Lakers," and decides that the public account "NBA insider" may be of interest to the user as well.

In accordance with some embodiments, the online behavior information includes one or more public social network accounts subscribed by the user on one or more other social network platforms distinct from the social network platform. The server identifies, as the at least one recommended public social network account, one or more public social network accounts on the social network platform that are associated with the same entities as the one or more public social network accounts subscribed by the user on the one or more other social network platforms. For example, the client device (through the operation of the client application for social network platform) can gather public account subscription information from other social network client applications installed on the client device, and send this information the server of the social network platform as part of the online behavior information. The server then determines if there are corresponding public accounts on its own platform based on the received subscription information. For example, the server finds that a user follows "Bloomberg" on twitter, the server then recommends "Bloomberg" account on its own social network to the user.

In accordance with some embodiments, the user profile further includes social network contacts of the user on the social network platform. The server identifies, as the at least one recommended public social network account, one or more public social network accounts on the social network platform that are subscribed to by a threshold number of the user's social network contacts. For example, if x number of the user's social network contacts are following a particular public account, the server can recommend this public account to the user. In some embodiments, the server also identifies a subset of the social network contacts based on one or more criteria, and only selects the recommended public accounts from the public accounts subscribed by this subset of social network contacts. For example, the subset of social network contacts can be contacts that are of the same age group as the user, contacts that are of the same occupation as the user, contacts that are family members of the user, contacts that are in the same geographic area as the user, etc. The threshold number may range from two to five. For example, the server finds that 40% of the user's contacts that belong to "colleague" category have subscribed "Planet Earth," the server may recommend "Planet Earth" to the user and note that 40% of his colleagues have subscribed this account.

The algorithm can also be more complex and dig subtle cues from user profile by statistical tools. In accordance with some embodiments, the server obtains a plurality of dimensions of user accounts; assigns a dimension value for each of the plurality of the dimensions to the user account based on selected information items; and selects the at least one public social network account that matches the respective user dimension values for the plurality of the dimensions. For example, to decide whether to recommend financial news public account to a user, the server obtains four dimensions of the user, which are closeness of the user's occupation to finance, interest to investments, living in Manhattan and general interest in financial news. The closeness of the user's occupation to finance is a number based on the how much the occupation is influenced by financial news, e.g., 100 for a commodity trader, 10 for a taxi driver. Interest to investments measures how much investments the user has made in financial market and how much attention the user has paid to market changes, 50 for a user with an option account, 8 for a user who only invests in his own house. Living in Manhattan is either 1 or 0. General interest in financial news can be measured by how many public accounts the user has subscribed in this and other social networks.

In order to match a user with a public account, the server also obtains dimensions of public accounts. In some embodiments, the dimensions of public accounts are measured either by the average of dimensions of all subscribers, or by the average of dimensions of the subscribers who have taken the recommendations (so excluding those subscribe on their own). In accordance with some embodiments, the process of calculating the dimensions of public accounts includes obtaining a plurality of dimensions of social network user accounts; obtaining the dimension values for the plurality of the dimensions of all user accounts; averaging the dimension values for the plurality of the dimensions of all user accounts by dimension to obtain an average subscriber dimension value for each of the plurality of the dimensions; and using the respective average subscriber dimension value as the dimension value of the first public social network account for each of the plurality of the dimensions.

Once dimension values of the user accounts and public accounts are obtained, the server can compare the dimension values to match user account and public accounts. One way of comparison is to sum up the absolute difference in each dimension of a user account and a public account. For example, the table below illustrates the calculating process of comparison. The first row includes names of dimensions, the second row includes dimension values of the user account A, the third row includes dimension values of the public account B, the fourth row includes the difference between the user account A and the public account B in each dimension; and the last row includes the sum of the absolute difference in all dimensions. The total dimension difference is 127, which signals the similarity between the user account A and the public account B. The server may set a threshold to determine whether to recommend the public account B. For example, the server may set predetermined criteria that public accounts with total dimension difference lower than 100 from a user account may be recommended to the user account. For another example, every Sunday the server recommends the three public accounts with lowest total dimension difference that have not been recommended before to the user account.

|  | Dimensions | | | | | | | |
| --- | --- | --- | --- | --- | --- | --- | --- | --- |
|  | D1 | D2 | D3 | D4 | D5 | D6 | D7 | D8 |
| User Account A | 10 | 38 | 48 | 3 | 100 | 1 | 23 | 17 |
| Public Account B | 33 | 20 | 33 | 70 | 100 | 0 | 22 | 15 |
| Absolute Difference in Dimension | 23 | 18 | 15 | 67 | 0 | 1 | 1 | 2 |
| Total dimension difference | | | | 127 | | | | |

In some embodiments, the absolute difference of each dimension is "standardized," i.e., the difference in each dimension is divided by the standard deviation of user dimension values in the respective dimension of all users. Further, the weight of every dimension does not have to be the same. In addition, there are many other statistical way of comparing the dimension values of a user account and a public account, which will not be exhaustively described here. A change in one dimension may have larger predicative power for users' preferences than the same change in another dimension. If so, the former dimension should have higher weight than the latter dimension.

In accordance with some embodiments, the server periodically collects statistics of user accounts subscribing recommended public social network accounts; and updates the matching algorithm based on the collected statistics. There are at least five ways updating the matching algorithm: changing the dimension values of public accounts, changing the information items to be collected, changing the way of calculating dimension values, changing the dimensions to be used and changing the weights of each dimension. For example, when a public account attracts more subscribers, the dimension values of the public account change with the composition of its subscribers. For another example, if in follow-up testing, a dimension is found to be more predicative than previously realized, a developer can increase the weight of the dimension. (Changing weights of dimensions can also happen automatically in the matching algorithm in some embodiments.)

In accordance with some embodiments, in a step 704, the server recommends the at least one public social network account to the user associated with the user account.

In some embodiments, "recommending" the at least one public social network account" means presenting the at least one public social network account IDs and some simple descriptions of the public social network account to the user, so that the user can easily follow or subscribe to the messages of the public social network account. For example, the user can select the icon for the public account in the user interface of the client application for the social network platform to "follow" or confirm automatic subscription to the public account.

In accordance with some embodiments, recommending the at least one public social network account to the user associated with the user account further comprises: making the user account subscribe to the recommended at least one public social network account by default; determining whether a user confirmation for the default subscription to the recommended at least one public social network account has been received from the user account within a predetermined period of time. In some embodiments, user confirmation can be determined based on the user's behavior toward the at least one public social network account after the default subscription has been made. For example, if the user has never opened any messages from the public account during the three days after the default subscription, or if the user has not opened any messages from the public account for at least x number of times during a period of three weeks after the default subscription, the subscription automatically expires and the public account is removed from the subscription list. The user confirmation can also be provided by the user as an explicit confirmation to subscribe. In some embodiments, in accordance with a determination that the user confirmation for the default subscription has been received from the user account within the predetermined period of time, the server keeps the default subscription of the recommended public social network account; and in accordance with a determination that no user confirmation for the default subscription has been received from the user account, the makes the user account unsubscribe from the at least one recommended public social network account.

Figure 8:
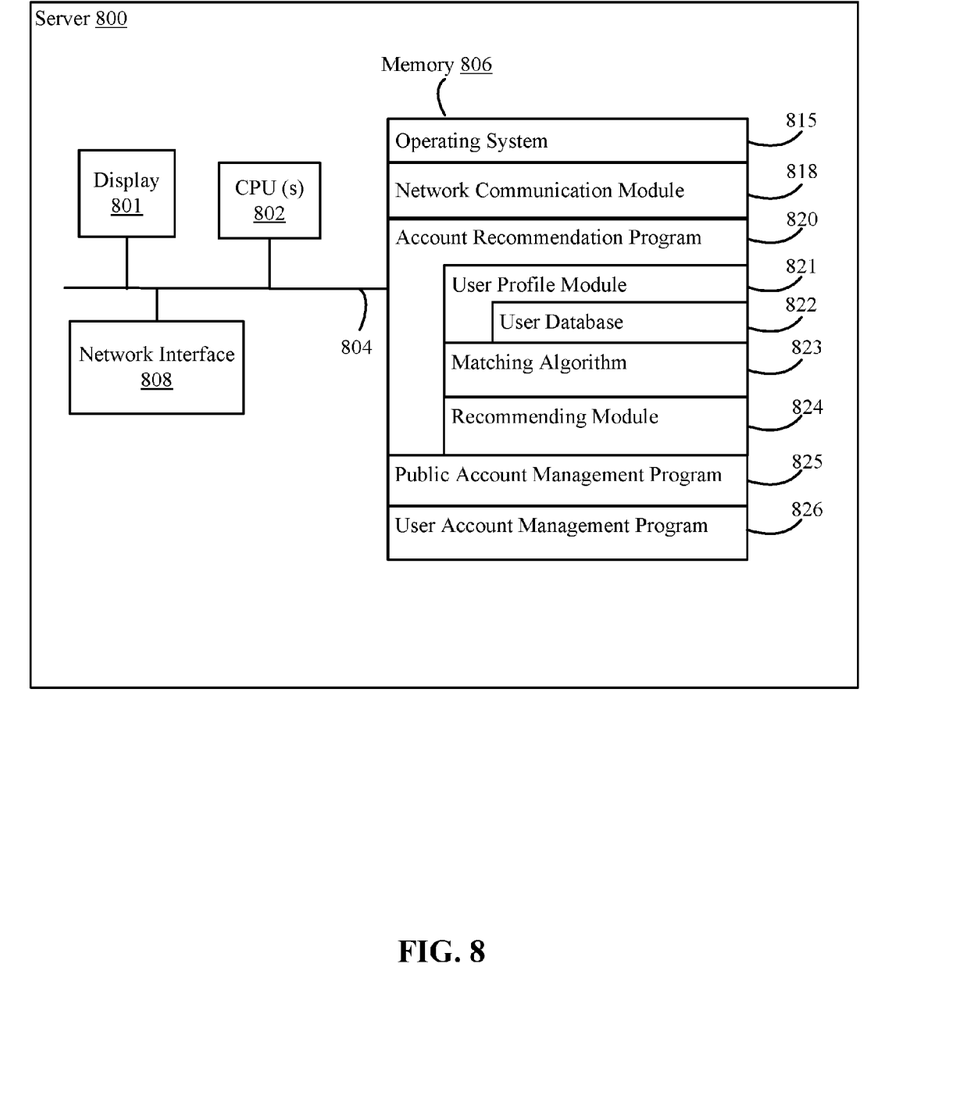
FIG. 8 is a diagram of an example implementation of a server in accordance with some embodiments.

FIG. 8 is a diagram of an example implementation of a server 800 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the server 800 includes one or more processing units (CPU's) 802, one or more network or other communications interfaces 808, a display 801, memory 806, and one or more communication buses 804 for interconnecting these and various other components. The communication buses may include circuitry (sometimes called a chipset) that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 may optionally include one or more storage devices remotely located from the CPU(s) 802. The memory 806, including the non-volatile and volatile memory device(s) within the memory 806, comprises a non-transitory computer readable storage medium.

In some implementations, the memory 806 or the non-transitory computer readable storage medium of the memory 806 stores the following programs, modules and data structures, or a subset thereof including an operating system 816, a network communication module 818, an account recommendation program 820, a public account management program 825, and a user account management program 826.

In accordance with some embodiments, the operating system 816 includes procedures for handling various basic system services and for performing hardware dependent tasks.

In accordance with some embodiments, the network communication module 818 facilitates communication with other devices via the one or more communication network interfaces 808 (wired or wireless) and one or more communication networks, such as the internet, other wide area networks, local area networks, metropolitan area networks, and so on.

In accordance with some embodiments, the account recommendation program 820 provides recommendation services to user accounts. In some embodiments, the account recommendation program 820 includes a user profile module 821, matching algorithm 823, and a recommending module 824. The user profile module 821 collects user profile, both from an internal user database 822 and from user devices. The matching algorithm 823 is configured to match public accounts with user accounts based on inputs from the user profile module and pre-stored parameters of the public accounts. The matching algorithm 823 is updated periodically to reflect new statistical result of user subscription. The recommending module 824 is configured to recommend public accounts to user accounts through user account management program.

In accordance with some embodiments, the public account management program 825 regulates the behavior of public accounts and manages the subscriptions to the public accounts. The user account management program 826 manages regular user accounts, including account following, subscription and friend relationships.

The above is only the preferred embodiments and not intended to limit the application, and any modifications, equivalent replacements, improvements and the like within the spirit and principle of the application shall fall within the scope of protection of the application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the application to the precise forms disclosed. Many modifications and variations are possible in view of the above teachings. The implementations were chosen and described in order to best explain principles of the application and its practical applications, to thereby enable others skilled in the art to best utilize the application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details.

What is claimed is:

1. A method of recommending public social network accounts on a social network platform, comprising:
   at a server of having one or more processors and memory for storing one or more programs to be executed by the one or more processors:
      obtaining a user profile of a user account of the social network platform, the user profile including at least identity and online behavior information of a user associated with the user account;
      selecting one or more information items from the user profile in accordance with a matching algorithm for selecting the recommended public social network accounts;
      running the matching algorithm to obtain at least one recommended public social network account that matches the selected information items, wherein running the matching algorithm includes:
         obtaining a plurality of dimensions that characterize potential subscribers of a respective candidate public account to be recommended to the potential subscribers;
         determining user-specific values for the plurality of dimensions in accordance with the one or more information items selected from the user profile of the user account;
         for the respective candidate public account, determining public-account-specific values for the plurality of dimensions that correspond to the user-specific values that have been determined for the user account;
         calculating a predefined measure of similarity between the user account and the respective candidate public account based on the user-specific values for the plurality of dimensions and the corresponding public-account-specific values for the plurality of dimensions; and
         selectively including the respective candidate public account in the at least one recommended public social network account that matches the selected information items based on the predefined measure of similarity; and
      recommending the at least one public social network account to the user associated with the user account.

2. The method of claim 1, wherein recommending the at least one public social network account to the user associated with the user account further comprises:
   making the user account subscribe to the recommended at least one public social network account by default;
   determining whether a user confirmation for the default subscription to the recommended at least one public social network account has been received from the user account within a predetermined period of time:
      in accordance with a determination that the user confirmation for the default subscription has been received from the user account within the predetermined period of time, keeping the default subscription of the recommended public social network account; and
      in accordance with a determination that no user confirmation for the default subscription has been received from the user account, making the user account unsubscribe from the at least one recommended public social network account.

3. The method of claim 1, wherein the online behavior information includes one or more existing public social network accounts subscribed by the user account on the social network platform, and wherein running the matching algorithm to obtain at least one recommended public social network account that matches the selected information items further comprises:
   identifying one or more public social network accounts that are similar to the one or more existing public social network accounts subscribed by the user account on the social network platform as the at least one recommended public social network account.

4. The method of claim 1, wherein the online behavior information includes one or more public social network accounts subscribed by the user on one or more other social network platforms distinct from the social network platform, and wherein running the matching algorithm to obtain at least one recommended public social network account that matches the selected information items further comprises:
   identifying, as the at least one recommended public social network account, one or more public social network accounts on the social network platform that are associated with the same entities as the one or more public social network accounts subscribed by the user on the one or more other social network platforms.

5. The method of claim 1, wherein the user profile further includes social network contacts of the user on the social network platform, and wherein running the matching algorithm to obtain at least one recommended public social network account that matches the selected information items further comprises:
   identifying, as the at least one recommended public social network account, one or more public social network accounts on the social network platform that are subscribed to by a threshold number of the user's social network contacts.

6. The method of claim 1, further comprising:
   generating desired public account selection parameters in accordance with the matching algorithm;
   sending desired public account selection parameters to a user device associated with the user account; and receiving respective parameter values for the desired selection parameters from the user device, wherein the user device, in accordance with the desired public account selection parameters, collects activity data from at least one other application on the user device and generates the parameter values for the desired selection parameters by summarizing the collected activity data.

7. The method of claim 1, further comprising:
periodically collecting statistics of user accounts subscribing recommended public social network accounts; and
updating the matching algorithm based on the collected statistics.

8. A device of recommending public social network accounts on a social network platform, comprising:
one or more processors; and
memory storing one or more programs for execution by the one or more processors, the one or more programs including instructions for:
obtaining a user profile of a user account of the social network platform, the user profile including at least identity and online behavior information of a user associated with the user account;
selecting one or more information items from the user profile in accordance with a matching algorithm for selecting the recommended public social network accounts;
running the matching algorithm to obtain at least one recommended public social network account that matches the selected information items, wherein running the matching algorithm includes:
obtaining a plurality of dimensions that characterize potential subscribers of a respective candidate public account to be recommended to the potential subscribers;
determining user-specific values for the plurality of dimensions in accordance with the one or more information items selected from the user profile of the user account;
for the respective candidate public account, determining public-account-specific values for the plurality of dimensions that correspond to the user-specific values that have been determined for the user account;
calculating a predefined measure of similarity between the user account and the respective candidate public account based on the user-specific values for the plurality of dimensions and the corresponding public-account-specific values for the plurality of dimensions; and
selectively including the respective candidate public account in the at least one recommended public social network account that matches the selected information items based on the predefined measure of similarity; and
recommending the at least one public social network account to the user associated with the user account.

9. The device of claim 8, wherein recommending the at least one public social network account to the user associated with the user account further comprises:
making the user account subscribe to the recommended at least one public social network account by default;
determining whether a user confirmation for the default subscription to the recommended at least one public social network account has been received from the user account within a predetermined period of time:
in accordance with a determination that the user confirmation for the default subscription has been received from the user account within the predetermined period of time, keeping the default subscription of the recommended public social network account; and
in accordance with a determination that no user confirmation for the default subscription has been received from the user account, making the user account unsubscribe from the at least one recommended public social network account.

10. The device of claim 8, wherein the online behavior information includes one or more existing public social network accounts subscribed by the user account on the social network platform, and wherein running the matching algorithm to obtain at least one recommended public social network account that matches the selected information items further comprises:
identifying one or more public social network accounts that are similar to the one or more existing public social network accounts subscribed by the user account on the social network platform as the at least one recommended public social network account.

11. The device of claim 8, wherein the online behavior information includes one or more public social network accounts subscribed by the user on one or more other social network platforms distinct from the social network platform, and wherein running the matching algorithm to obtain at least one recommended public social network account that matches the selected information items further comprises:
identifying, as the at least one recommended public social network account, one or more public social network accounts on the social network platform that are associated with the same entities as the one or more public social network accounts subscribed by the user on the one or more other social network platforms.

12. The device of claim 8, wherein the user profile further includes social network contacts of the user on the social network platform, and wherein running the matching algorithm to obtain at least one recommended public social network account that matches the selected information items further comprises:
identifying, as the at least one recommended public social network account, one or more public social network accounts on the social network platform that are subscribed to by a threshold number of the user's social network contacts.

13. The device of claim 8, wherein the operations further comprise:
generating desired public account selection parameters in accordance with the matching algorithm;
sending desired public account selection parameters to a user device associated with the user account; and
receiving respective parameter values for the desired selection parameters from the user device, wherein the user device, in accordance with the desired public account selection parameters, collects activity data from at least one other application on the user device and generates the parameter values for the desired selection parameters by summarizing the collected activity data.

14. The device of claim 8, wherein the operations further comprise:
periodically collecting statistics of user accounts subscribing recommended public social network accounts; and updating the matching algorithm based on the collected statistics.

15. A non-transitory computer readable storage medium having instructions stored thereon, the instructions, when executed by one or more processors, cause the processors to perform operations comprising:
   obtaining a user profile of a user account of the social network platform, the user profile including at least identity and online behavior information of a user associated with the user account;
   selecting one or more information items from the user profile in accordance with a matching algorithm for selecting the recommended public social network accounts;
   running the matching algorithm to obtain at least one recommended public social network account that matches the selected information items, wherein running the matching algorithm includes:
      obtaining a plurality of dimensions that characterize potential subscribers of a respective candidate public account to be recommended to the potential subscribers;
      determining user-specific values for the plurality of dimensions in accordance with the one or more information items selected from the user profile of the user account;
      for the respective candidate public account, determining public-account-specific values for the plurality of dimensions that correspond to the user-specific values that have been determined for the user account;
      calculating a predefined measure of similarity between the user account and the respective candidate public account based on the user-specific values for the plurality of dimensions and the corresponding public-account-specific values for the plurality of dimensions; and
      selectively including the respective candidate public account in the at least one recommended public social network account that matches the selected information items based on the predefined measure of similarity; and
   recommending the at least one public social network account to the user associated with the user account.

16. The non-transitory computer readable storage medium of claim 15, wherein recommending the at least one public social network account to the user associated with the user account further comprises:
   making the user account subscribe to the recommended at least one public social network account by default;
   determining whether a user confirmation for the default subscription to the recommended at least one public social network account has been received from the user account within a predetermined period of time:
      in accordance with a determination that the user confirmation for the default subscription has been received from the user account within the predetermined period of time, keeping the default subscription of the recommended public social network account; and
      in accordance with a determination that no user confirmation for the default subscription has been received from the user account, making the user account unsubscribe from the at least one recommended public social network account.

17. The non-transitory computer readable storage medium of claim 15, wherein the online behavior information includes one or more existing public social network accounts subscribed by the user account on the social network platform, and wherein running the matching algorithm to obtain at least one recommended public social network account that matches the selected information items further comprises:
   identifying one or more public social network accounts that are similar to the one or more existing public social network accounts subscribed by the user account on the social network platform as the at least one recommended public social network account.

18. The non-transitory computer readable storage medium of claim 15, wherein the online behavior information includes one or more public social network accounts subscribed by the user on one or more other social network platforms distinct from the social network platform, and wherein running the matching algorithm to obtain at least one recommended public social network account that matches the selected information items further comprises:
   identifying, as the at least one recommended public social network account, one or more public social network accounts on the social network platform that are associated with the same entities as the one or more public social network accounts subscribed by the user on the one or more other social network platforms.

19. The non-transitory computer readable storage medium of claim 15, wherein the user profile further includes social network contacts of the user on the social network platform, and wherein running the matching algorithm to obtain at least one recommended public social network account that matches the selected information items further comprises:
   identifying, as the at least one recommended public social network account, one or more public social network accounts on the social network platform that are subscribed to by a threshold number of the user's social network contacts.

20. The non-transitory computer readable storage medium of claim 15, wherein the operations further comprise:
   generating desired public account selection parameters in accordance with the matching algorithm;
   sending desired public account selection parameters to a user device associated with the user account; and
   receiving respective parameter values for the desired selection parameters from the user device, wherein the user device, in accordance with the desired public account selection parameters, collects activity data from at least one other application on the user device and generates the parameter values for the desired selection parameters by summarizing the collected activity data.

* * * * *